United States Patent
Stross et al.

(10) Patent No.: US 12,423,367 B2
(45) Date of Patent: Sep. 23, 2025

(54) SEARCH ENGINE INTERFACE USING TAG/OPERATOR SEARCH CHIP OBJECTS

(71) Applicant: Stross Holdings LLC, Cedar Park, TX (US)

(72) Inventors: Charnae V. Stross, Cedar Park, TX (US); Alexander B. Stross, Cedar Park, TX (US)

(73) Assignee: Stross Holdings LLC, Cedar Park, TX (US)

( * ) Notice: Subject to any disclaimer, the term of this patent is extended or adjusted under 35 U.S.C. 154(b) by 41 days.

(21) Appl. No.: 18/382,185

(22) Filed: Oct. 20, 2023

(65) Prior Publication Data
US 2025/0131049 A1    Apr. 24, 2025

(51) Int. Cl.
G06F 16/00     (2019.01)
G06F 9/451     (2018.01)
G06F 16/9532   (2019.01)

(52) U.S. Cl.
CPC .......... *G06F 16/9532* (2019.01); *G06F 9/451* (2018.02)

(58) Field of Classification Search
None
See application file for complete search history.

(56) References Cited

U.S. PATENT DOCUMENTS

| | | | |
|---|---|---|---|
| 9,015,190 B2 | 4/2015 | Carter et al. | |
| 2002/0080187 A1* | 6/2002 | Lawton | G06F 16/9538 715/810 |
| 2002/0174118 A1 | 11/2002 | Bates et al. | |
| 2007/0266019 A1* | 11/2007 | Lavi | G06F 16/9532 707/999.005 |
| 2009/0150351 A1 | 6/2009 | Buck et al. | |
| 2013/0024440 A1* | 1/2013 | Dimassimo | G06F 16/951 707/706 |
| 2016/0063124 A1* | 3/2016 | Lee | G06F 16/9538 707/731 |

(Continued)

OTHER PUBLICATIONS

DISCO, "DISCO search syntax manual" [online], retrieved on Jul. 10, 2023, from the Internet URL: https://support.csdisco.com/hc/en-us/articles/213049583-DISCO-search (2023).

(Continued)

*Primary Examiner* — Tony Mahmoudi
*Assistant Examiner* — Suman Rajaputra
(74) *Attorney, Agent, or Firm* — Jack V. Musgrove

(57) ABSTRACT

A search engine interface allows a user to add search chips to a query, where the chips have both a tag and an operator specifically associated with the tag that is represented by a visual indicator such as a particular color. Search chips are interactive objects which can be manipulated in different manners including changing the associated operator. So an "INCLUDE" operator may be assigned to a tag with a green color while an "EXCLUDE" operator may be assigned to another tag with a red color. Pure operators like "OR" or grouping parentheses can also be inserted in the search query (without any associated tag). The invention may further provide a unique "coin-flip" operator that results in random use of only one of several search chips in carrying out a search. Search results can be presented in certain ordered groups depending on which operators are involved.

19 Claims, 10 Drawing Sheets

(56) References Cited

U.S. PATENT DOCUMENTS

| | | | |
|---|---|---|---|
| 2016/0098485 A1* | 4/2016 | Burke | G06F 3/04842 |
| | | | 707/706 |
| 2016/0299973 A1* | 10/2016 | Oakeson | G06F 16/9535 |
| 2016/0357403 A1* | 12/2016 | Chang | G06F 3/0482 |
| 2017/0235799 A1 | 8/2017 | Miller et al. | |
| 2021/0173850 A1* | 6/2021 | Ross | G06F 16/9032 |
| 2022/0207096 A1 | 6/2022 | Salazar et al. | |

OTHER PUBLICATIONS

UX Movement, "Why Chips Should Replace Checkboxes and Radio Buttons" [online], retrieved on Aug. 31, 2023, from the Internet URL: https://uxmovement.medium.com/why-chips-should-replace-checkboxes-and-radio-buttons-52f909a5b8f3 (2023).

* cited by examiner

SEARCH ENGINE INTERFACE USING TAG/OPERATOR SEARCH CHIP OBJECTS

BACKGROUND OF THE INVENTION

Field of the Invention

The present invention generally relates to computerized searching, and more particularly to a search engine interface that allows users to combine keywords or search tags using various operators.

Description of the Related Art

Search engines have grown immensely in popularity and capability since the advent of the Internet. Even before the Internet, there was a lot a computerized searching available in private databases such as DIALOG which offered a collection databases and WESTLAW, a legal database. These earliest information retrieval systems employed a rudimentary interface that allowed users to search for keywords found in documents including various combinations based on basic Boolean operators like "AND" and "OR", proximity operators, and separators such as parentheses, and searching within specified fields of documents like the title, body or date. Other simple search interfaces were provided in the first incarnations of the Internet (e.g., ARPANET) such as Gopher, a distributed hypertext protocol, which eventually led to browsers for the world wide web such as Netscape and early search engines like Webcrawler.

Since then, search engine technology has exploded with a wide number of popular engines currently available including Google, Bing and DuckDuckGo. Advanced systems go beyond simple Boolean equations using techniques like natural language processing and machine learning, or artificial intelligence (AI), to yield more intuitive results. Each of these systems provides a basic search interface via a web browser or other application having a user search field that allows a user to enter the text to be searched for. Some interfaces have custom settings that allow the user to refine a search via advanced options, including presenting multiple search fields for different categories of phrases, sources, file types, etc.

SUMMARY OF THE INVENTION

The present invention in at least one embodiment is generally directed to a method of building a search query using a search engine interface by presenting to a user lists of different kinds of tags, receiving a first selection from the user of a first one of the tags, adding a first search chip to the search query wherein the first search chip is displayed in a user search field of the search engine interface with both the first tag and a first visual indicator representing a first operator associated with the first tag, receiving a second selection from the user of a second one of the tags, and adding a second search chip to the search query wherein the second search chip is displayed in the user search field with both the second tag and a second visual indicator representing a second operator associated with the second tag. In the illustrative implementation the first operator is a default operator initially assigned automatically to both the first search chip and the second search chip, so the second search chip is initially displayed with the first visual indicator in the user search field, and the second operator is thereafter assigned to the second search chip in response to receiving a user command to change an operation for the second search chip whereupon the second search chip is then displayed with the second visual indicator. The first and second search chips are interactive objects, and the user command to change the operation for the second search chip is received by detecting a user activation of the second search chip as initially displayed in the user search field. For example, the first operator may be an INCLUDE operator having a first color like green, while the second operator may be an EXCLUDE operator having a second color like red. Pure operators like "OR" or grouping parentheses can also be inserted in the search query (without any associated tag). The invention may further provide a unique "coin-flip" operator that results in random use of only one of the first or second search chips in carrying out a search.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

While search engines have become greatly enhanced over the years, search engine interfaces are still deficient in many respects, including the lack of more intuitive features to help the user better understand and create custom search queries. Searching options have been expanded but are still relatively limited considering the huge number of characteristics that might be associated with a given subject. For instance, if a person wants to find a dining location that is suitable, they might want to enter a variety of constraints that are simply not available using conventional search engines, such as searching for establishments that have been recommended by a friend or social influencer, or effectuate a search that includes input from multiple users in a group.

It would, therefore, be desirable to devise an improved search engine interface that can easily be implemented which allows the user to directly build a more refined search query that amplifies basic functions like search tags and Boolean operations. It would be further advantageous if the search engine interface could allow for more effective presentation of search results based on different individual constraints. These and other advantages are achieved in various implementations of the present invention by providing search chips for a user search field of a search engine interface which are interactive objects and have both a keyword or tag and a visual indicator that represents a specific operator to be associated with the tag. For example, an "AND" or "INCLUDE" operator associated with a tag might result in a green search chip, and a "NOT" or "EXCLUDE" operator associated with a tag might result in a red search chip. In this manner, the user can quickly perceive the basic nature of the search query terms and even manipulate them in order to modify the operators.

Figure 1:
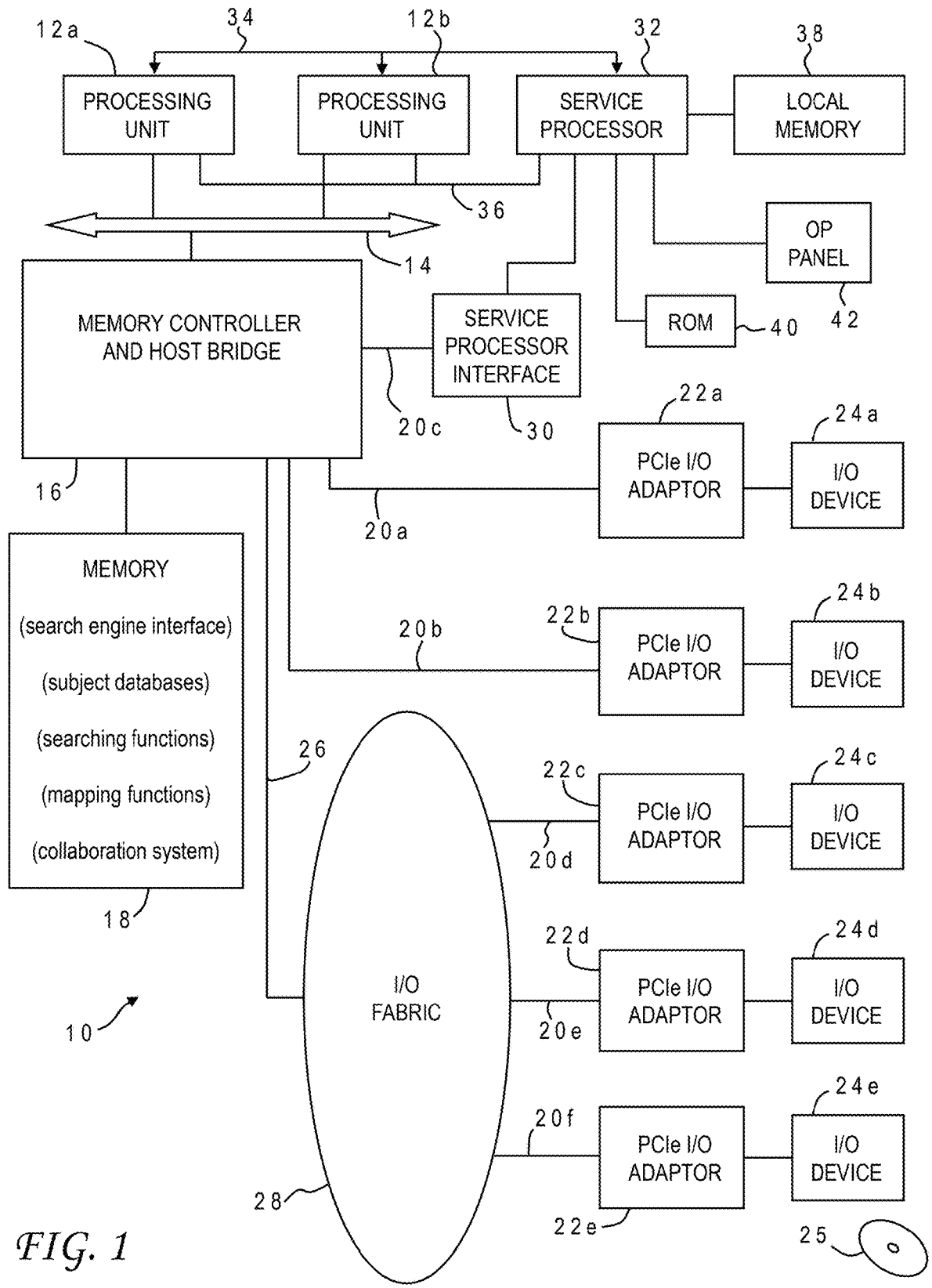
FIG. 1 is a block diagram of a computer system programmed to carry out search engine functions in accordance with one implementation of the present invention.

With reference now to the figures, and in particular with reference to FIG. 1, there is depicted one embodiment 10 of a computer system in which the present invention may be implemented to carry out computerized searching. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention depending upon the embodiment details. These applications may include, among others, a search engine interface for allowing a user to build a search query and view results, one or more subject databases which contain the information to be searched and retrieved, searching functions for executing a search based on the user-built search query, and mapping/drawing functions for computing and displaying a street map of an area which might be used as a basis for the search.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed.

Executable code is loaded into memory 18 and service processor 32 releases host processors 12a, 12b for execution of the program code, e.g., an operating system (OS) which is used to launch applications and in particular the search engine interface of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a search engine interface that uses novel interactive chip objects to build and manage a search query. Accordingly, a program embodying the invention may additionally include conventional aspects of various search engine tools, and these details will become apparent to those skilled in the art upon reference to this disclosure. The subject of the search may vary considerably according to the particular implementation. The following disclosure discusses the invention in the context of a restaurant search engine, but this disclosure should not be construed in a limiting sense as the search engine interface described herein is applicable to practically any subject of searching.

In some embodiments, one or more aspects of the present invention may be carried out using cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 2:
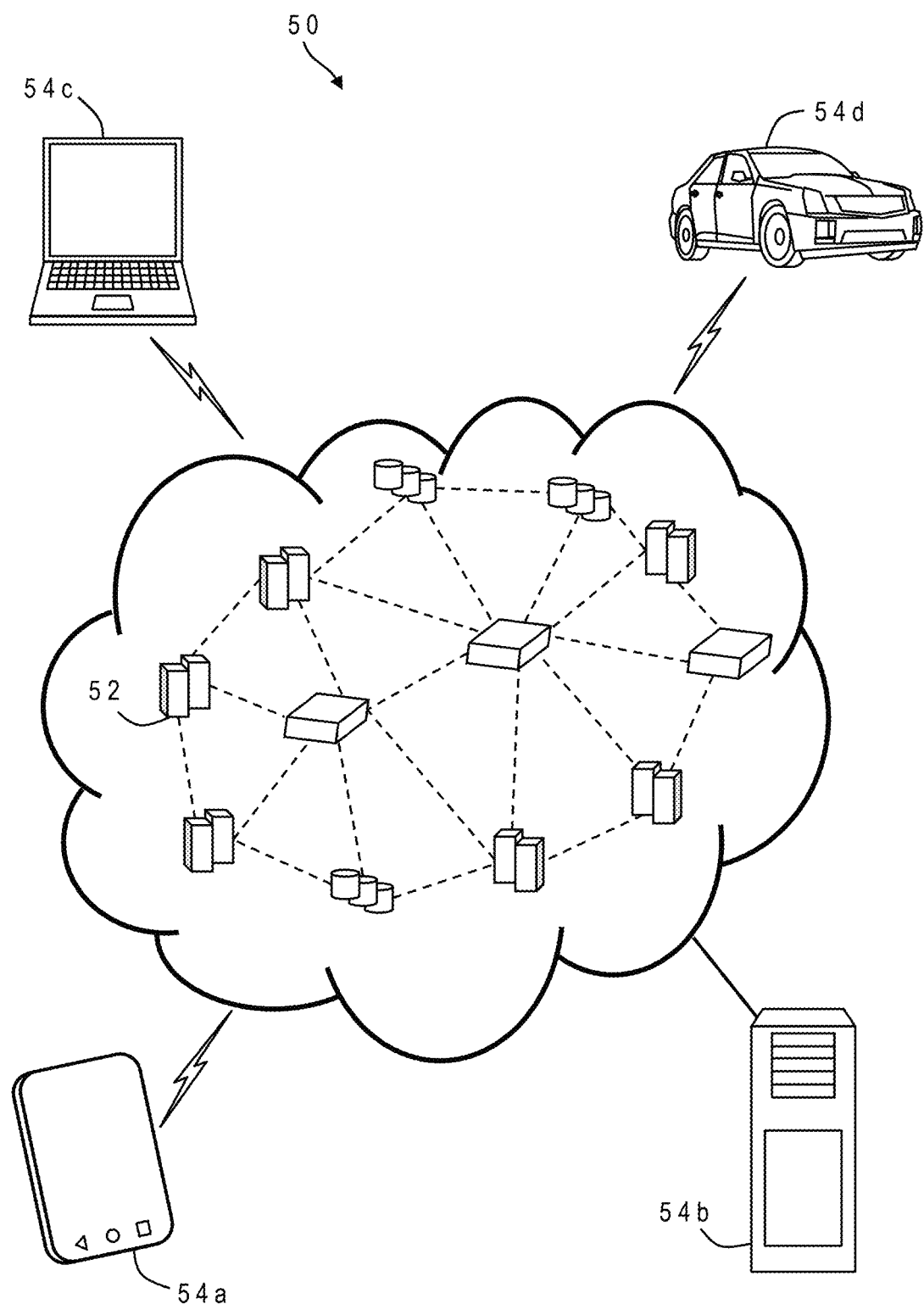
FIG. 2 is a pictorial representation of a cloud computing environment in accordance with one implementation of the present invention.

A cloud computing environment is service oriented with a focus on statelessness, low coupling, modularity, and semantic interoperability. At the heart of cloud computing is an infrastructure that includes a network of interconnected nodes. An illustrative cloud computing environment 50 is depicted in FIG. 2. As shown, cloud computing environment 50 includes one or more cloud computing nodes 52 with which local computing devices used by cloud consumers, such as, for example, personal digital assistant (PDA) or smartphone 54a, desktop computer 54b (e.g., computer system 10 of FIG. 1), laptop computer 54c, and/or automobile computer system 54d may communicate. Nodes 52 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54a-54d shown in FIG. 2 are intended to be illustrative only and that computing nodes 52 and cloud computing environment 50 can communicate with any type of computerized device over any type of network and/or network addressable connection (e.g., using a web browser).

In the illustrative implementation, certain aspects of the present invention can be carried out by a cloud server. The cloud server may for example be a node 52 of FIG. 2 having an architecture like computer system 10 of FIG. 1, in communication with client devices via the Internet. The cloud server can provide the computational power needed for the search engine as well as store and maintain the subject databases, while the search engine interface itself may be carried out by the local device. This division of program functionality is purely a matter of convenience as some functions of the search engine could be carried out on the local device (such as scripts in a web browser) and vice-versa, i.e., some functions of the interface could be provided by the cloud server.

Figure 3A:
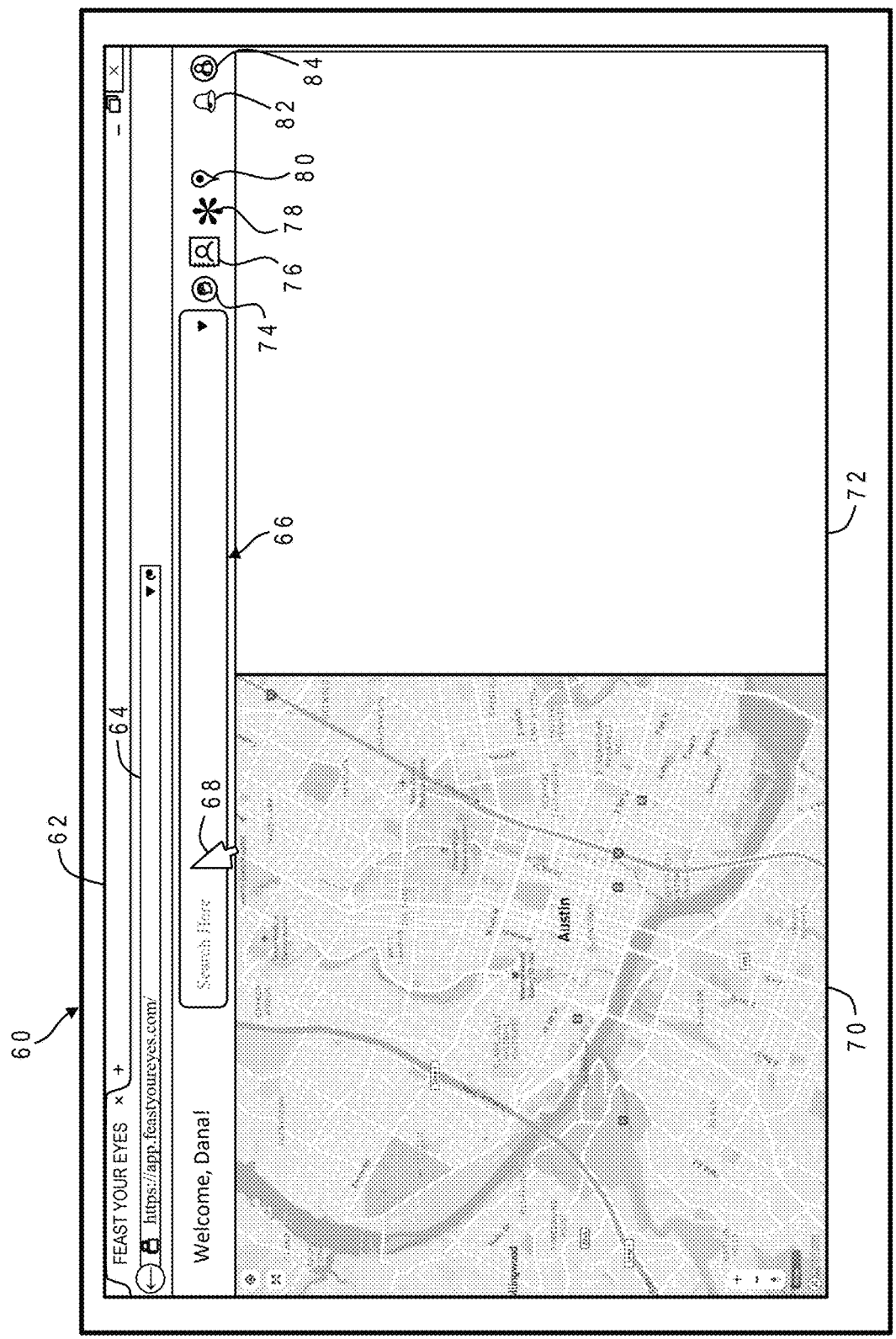
FIGS. 3A-3C are screenshots of a display device showing a search engine interface which allows a user to select and manipulate search chip objects representing tags having colors associated with respective operators in accordance with one implementation of the present invention for finding a suitable dining location.
Figure 3B:
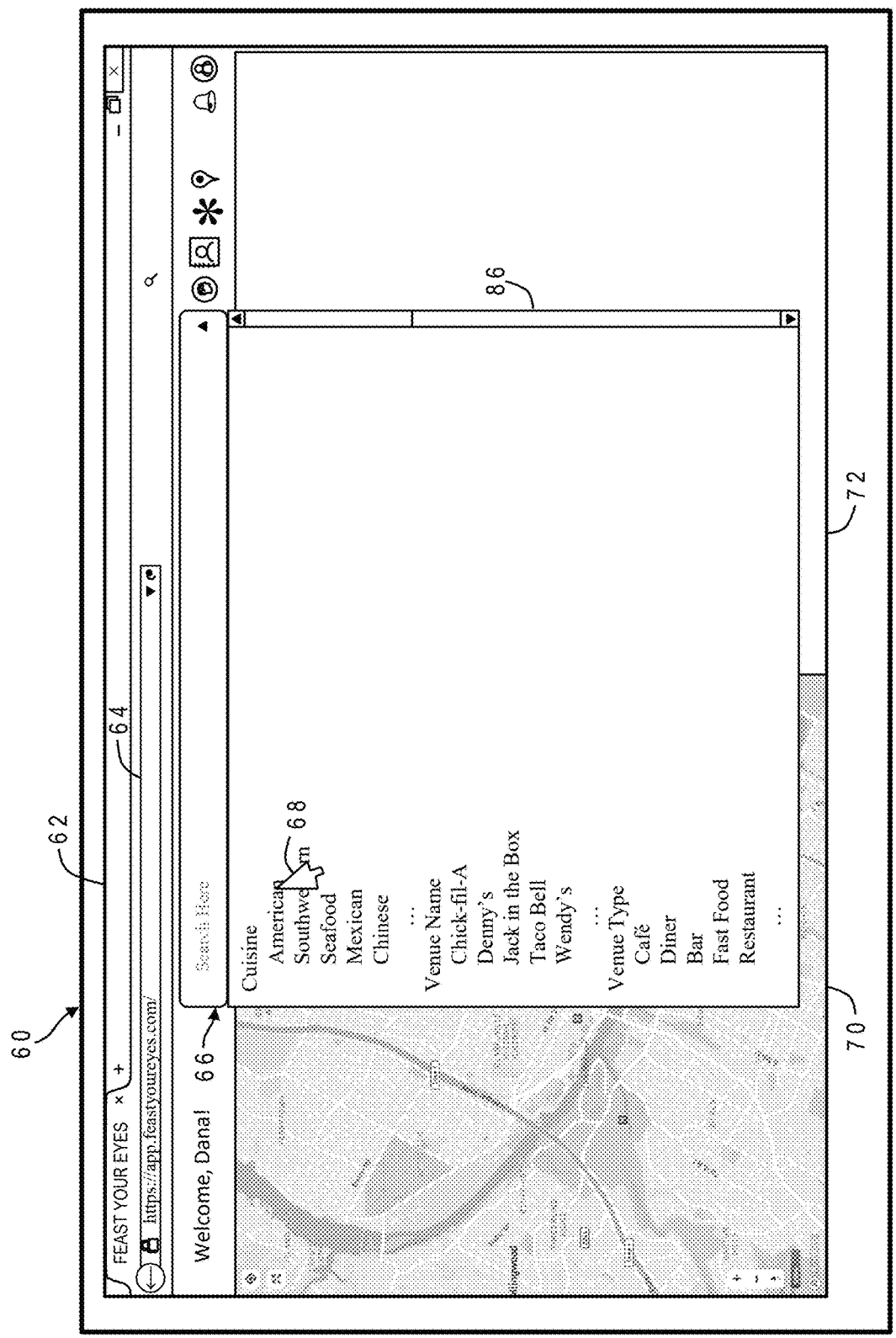
Figure 3C:
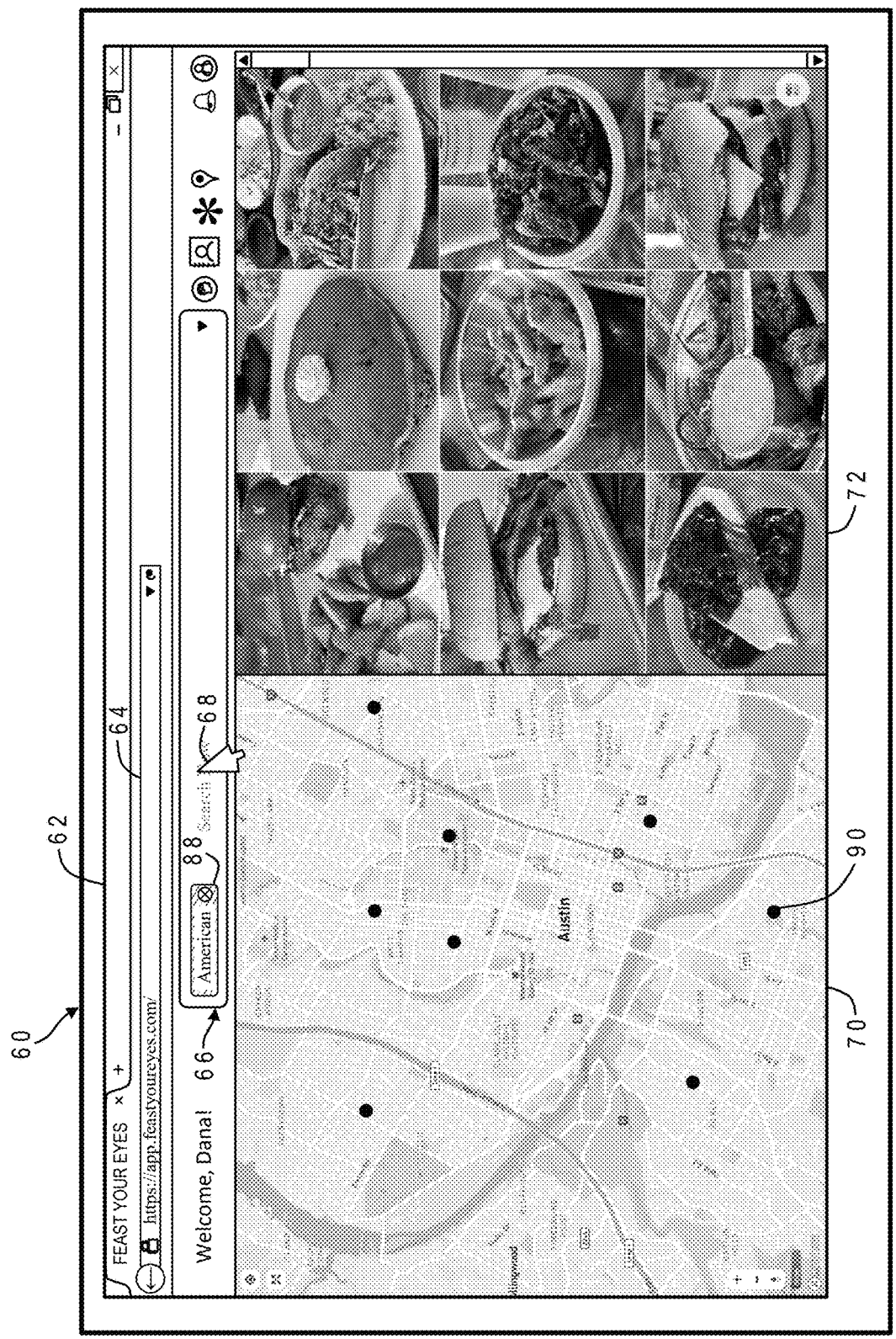

Referring now to FIGS. 3A-3C, there are depicted several screenshots of a display device 60 showing a search engine interface 62 which allows a user to select and manipulate search chip objects in accordance with one implementation of the present invention. Display device 60 may for example be an I/O device 24 of computer system 10, but as noted in conjunction with FIG. 2 the search engine interface can be provided on other client devices including tablets or smartphones, or on a display of a vehicle such as a car, using a touch screen and haptics. Accordingly, the features of the user interface as illustrated for the larger screen of FIGS. 3A-3B could be reformatted as needed. In this example, search engine interface 62 is implemented via a web browser which access the cloud server over the Internet via a universal resource locator (URL) 64. The browser appears as a window of display device 60, and may include a variety of conventional features not shown. Alternatively, the search engine interface can be implemented in a stand-alone program or app.

Search engine interface 62 includes a user search field 66 where the user builds a search query. The user can bring the focus of the interface to user search field 66 by clicking a mouse or other graphical pointing device represented by arrowhead 68, after which the user can begin typing potential keywords using a keyboard. As noted above, according to this example the search engine is adapted to find a suitable dining location, so search engine interface 62 has a map pane 70 providing a geographic reference for the searching which shows a metropolitan area having a multitude of dining facilities, and further has a results pane 72 in which results of the search query can be displayed. Search engine interface 62 may have several other interactive icons to invoke additional functions, including a coin-flip icon 74, a contacts icon 76, a specials icon 78, a locations icon 80, a messages icon 82, and a user account icon 84.

Bringing the focus to user search field 66 causes a drop-down (or pop-up) menu 86 to automatically appear as seen in FIG. 3B. Drop-down menu 86 presents a list of linguistic tags grouped into several restaurant-related categories such as but not limited to: cuisines (American, Seafood, Mexican, Chinese, Italian, Southwestern, Sushi, Asian, Mongolian, Vietnamese, etc.); specific venue names; venue types (bar, pub, grill, healthy, fast food, restaurant, café, breakfast, hotel, diner); dietary concerns such as allergies (soy, gluten, dairy, shellfish, sulfites), vegetarian (ovo/lacto), vegan, keto, kosher, halal; and other special categories described further below. The user can also begin typing a keyword in user search field 66 and drop-down menu 86 will adjust to display only those tags that match the partial user input. The list of tags in drop-down menu 86 may in some embodiments constitute a cloud of chips for different tag categories.

When a user clicks on one of the tags, such as "American", a corresponding search chip 88 is added to user search field 66 as seen in FIG. 3C. Those skilled in the art will appreciate that "clicking" is just one form of user activation or selection, and other methods could be used to pick a given search chip such as one or more keyboard commands or key combinations, tapping or haptics, and even eye movement tracking. Search chips used in accordance with the present invention have a visual indicator in addition to the tag itself, to represent a particular operator that is to be associated with that specific tag in building a sort of equation for the user search query. In FIG. 3C search chip 88 is drawn with background hash lines indicating that the chip is green colored, the color assigned by default. Further to this embodiment, the green color represents an "AND" or "INCLUDE" operator. As explained further below, user manipulation of a search chip can result in its appearance changing, such as turning to a different color like red which is then associated with a "NOT" or "EXCLUDE" operator. Search chips are not only a user interface element but are also a polymorphic data structure with search engine interface 62; they may further be thought of as containers that contain information, either linguistic, operational, expression, or functional. An expression chip is one that aggregates many other chips and can be stored in JSON format.

Other visual indicators may be used besides color, including shading, a colored (or weighted) border as opposed to the chip background, texture, hashing, underlines or overlines, fonts (style, weight, size, upper or lower case, bold, italics, strikethrough), squares or circles, special symbols such as checkmarks or X's, or combinations of the foregoing. A chip can also be constructed by showing a shape that is displayed to the side of the tag text in the user search field rather than overlapping or integral, but the shape and the tag together still comprise a unitary element of the interface. A chip is removed from the search query by clicking the small "x" at the side of the chip as displayed in user search field 66, or by other means such as dragging and dropping outside of the search field, or using the delete or backspace keys.

The search engine interface can immediately issue a command to the search engine to carry out a search based on a query in user search field 66 (and limited to the geographic area shown in map pane 70) each time a search chip is added to the field or each time a search chip is modified. Alternatively, the search engine interface can wait until the user has finished building the search query and executes a search function using a key (e.g., the "Enter" key) or clicks on a "Search Now" button proximate the user search field. Results of the search can then be displayed in a number of ways. In the illustrative embodiment, locations of dining establishments matching the search query are shown as small colored dots 90 on the map within map pane 70. Each dot can have the name of the associated dining establishment in smaller lettering (not shown) next to it, and hovering over a particular dot with the mouse or cursor can display additional information such as a number of stars indicating a review/approval score. Other features within map pane 70 could be provided for matching locations, such as different icons for certain types of venues, etc.

While solely textual search results could be displayed in results pane 72, search engine interface 62 instead preferably shows a series of images and/or videos representing dishes and vibes/events that are actually provided at each of the dining locations. Images for the search results may be curated in a variety of manners. Photographs can initially be obtained from direct restaurant uploads, online menu harvesting, API pulls from menu platforms, diner submission for approval, review sites, or agents in the field, and assembled into a group for each dining establishment. A specific photo/video (or set of photos) can be used as a search result for a given establishment based on different methods such as selecting a very popular dish at the establishment, discerning a particular taste of the user and attempting to find a match for that taste, or just random selection. In the example of FIG. 3C each image represents a dish from a separate establishment, i.e., one dish per establishment, but several images could be presented for a single establishment, for instance, with a given row of three images all being from the same establishment. The presentation of the dishes can also be based on a preferred "vibe" or event as discussed further below, i.e., a user will be able to search through a combination of taste, place and vibe criteria to assemble a more perfect result. Images are displayed within results pane 72 according to a ranking order. The ranking can be based on different considerations or combinations thereof (e.g., cost or user algorithm) but in the illustrative implementation they are ranked according to a perceived relevance based on the search query, with an establishment having the highest relevance being on the top row and leftmost, working right along a row and then down to the next row as relevance decreases. More complex methods for ordering the results are described in further detail below in conjunction with FIG. 5. In various implementations the user can hover the mouse over a given dish in results pane 72 to achieve different responses such as causing the image to advance through additional images of the same dish/venue, causing a video to begin to play, or finding out a sundry of details associated with the dish or establishment, and can click on the dish to open up another window, pane, box, or drop-down menu (not shown) that provides additional information and/or retrieval functions for the establishment.

Figure 4A:
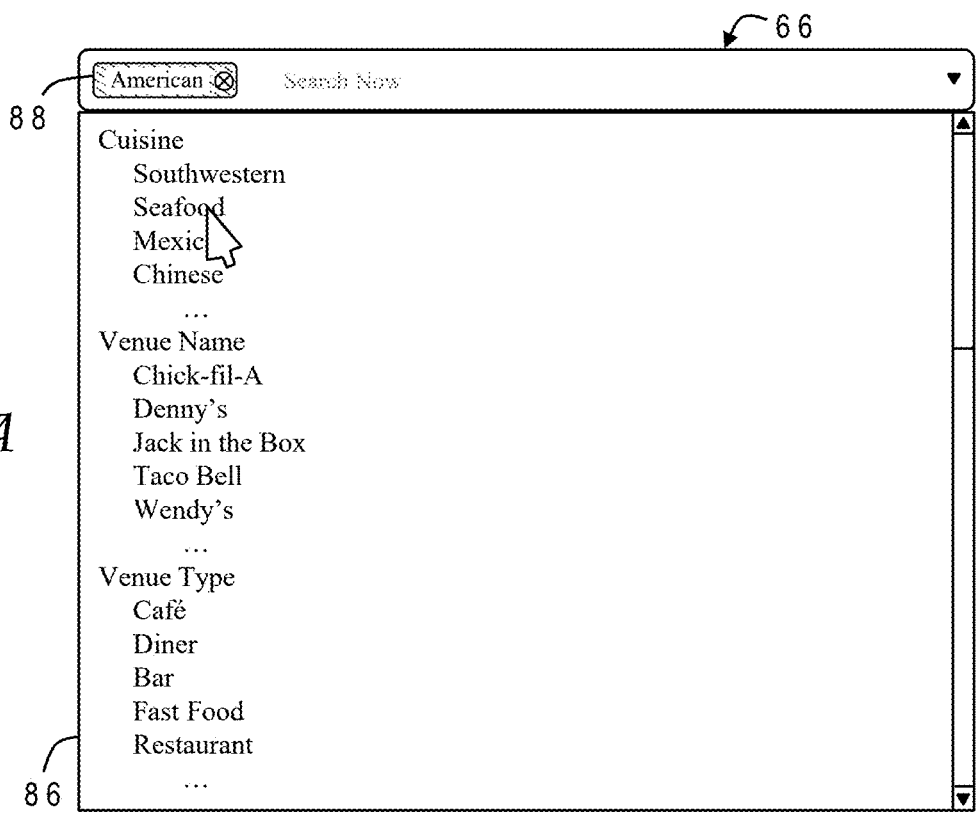
FIGS. 4A-4E are partial screenshots of the user search field and drop-down menu from the search engine interface of FIGS. 3A-3C illustrating how a user can change the color and associated operator for a given search chip object in accordance with one implementation of the present invention.
Figure 4B:
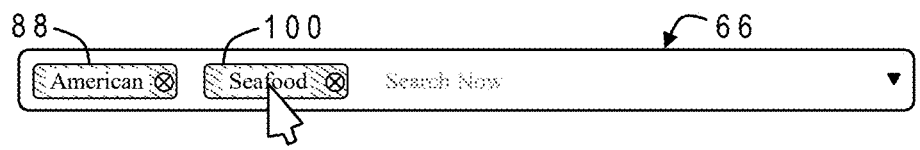
Figure 4C:
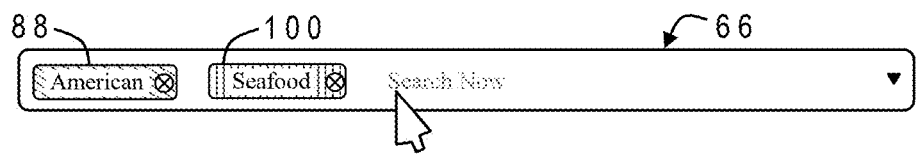

As mentioned above, a user can manipulate a particular search chip in the search field in order to modify the associated operator. The manipulation can be carried out using a number of different user inputs but the easiest way is for the user to click on a search chip as it is found within the search field. This manipulation can be understood with reference to the example of FIGS. 4A-4E which show user search field 66 (and drop-down menu 86 in FIG. 4A) but not the surrounding elements of search engine interface 62 for simplicity. FIG. 4A begins where FIG. 3C left off, i.e., after the user has added "American" chip 88 to user search field 66, and has now opened drop-down menu 86 to begin adding another tag, in this case, for seafood. FIG. 4B shows how the search query is modified to include both "American" chip 88 and a "Seafood" chip 100. The representation in FIG. 4B is when the user has first added "Seafood" chip 100 without further manipulation, so it has initially also been assigned the default color and operator, that is, green and "INCLUDE". So if the user were to execute a search using the query at this point, it would mean that the results must include American cuisine or seafood cuisine, i.e., any dining establishment that has either or both of these types of menu items, and both types of these dishes could be displayed in results pane 72. However, further to this example the user actually does not like seafood, so the user accordingly clicks on "Seafood" chip 100 within user search field 66 which responsively changes its color from green to red as indicated in FIG. 4C by the different hash lines used in the background behind the "Seafood" tag, the red color being associated with an "EXCLUDE" operator. Now the search engine interface will return results for dining establishments that have American cuisine but will not present any seafood dishes in the search results, e.g., a "Southern fried shrimp" dish might be considered American but since it constitutes seafood it will be excluded from the results.

The "EXCLUDE" function as just described is a sort of "soft" exclude that precludes specific dishes from showing up in search results, i.e., it is a dish-based exclusion rather than a venue-based exclusion. The invention also contemplates a "hard" exclude which prevents a given venue from being considered if that venue has anything on its menu represented by the exclude chip. According to a slightly different example, the user is now deathly allergic to seafood and does not trust that a kitchen will adequately prevent cross-contamination, so they actually want to exclude any establishment that has seafood on the menu. Using such a hard exclude operator would thus not only prevent seafood establishments from showing up (like an oyster bar), but would also result in exclusion of a venue that mostly serves non-seafood items but happens to have one salmon salad dish on the menu. The hard exclude might be fashioned to apply more widely to tree invalidation of any children objects of a venue, that is, not just dishes but also any specific ingredient or other consumable such as a condiment.

In the illustrative implementation, the exclude operator is soft by default, and the hard exclude function might be invoked in various manners, such as by cycling through operators as discussed further below in conjunction with FIG. 4E. A hard exclude chip might also have it own color, e.g., a darker shade of red such as crimson, or conversely a soft exclude chip might have a lighter red color like pink.

The invention can further be implemented with an onboarding process wherein a user is presented with a questionnaire that can identify various concerns, including any extreme allergies that might entail the use of the hard "EXCLUDE" operator. If a concern is so identified, the search engine interface can automatically facilitate this constraint in various ways, such as by creating such a search chip that is always included by default in any search, or by changing the default operator for the associated tag from "INCLUDE" to "EXCLUDE". There may be a passive mode of use for such a default exclude chip where it shows up in the user search field but with an altered appearance, such as grayed-out, and it becomes inactive, i.e., it does not affect the query unless otherwise activated. It may be noted that the hard exclude function has more general applicability than just food allergies; for example, a vegetarian may not want to eat at a restaurant that handles any meat product, a strict vegan can make sure they are eating at places that do not have any animal products on site (e.g., no milk or eggs which a vegetarian might eat), or a mom might create a chip for their child with an allergy to tree nuts so that they can make sure when they are eating with their child, they will not be served at venues that processes tree nuts anywhere on premises.

Figure 4D:
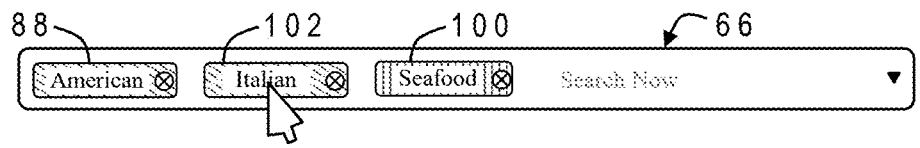

The manipulation of the search chips is not limited to include/exclude, but can be additionally nuanced in several ways. One involves the use of preferences (positive and/or negative) but not absolute requisites for search results, i.e., flexible constraints as opposed to rigid. This feature may be implemented using a "PREFER" operator and an "AVOID" operator. FIGS. 4D-4E illustrate one example of this feature in a continuation of the narrative of the foregoing figures. Further to this example the user desires to find a dining establishment that definitely has American cuisine and also preferably has Italian although it does not have to (and still excluding seafood). In FIG. 4D, the user has initially added a third search chip 102 for "Italian" which has the same default green color and "INCLUDE" operator. Search engine interface 62 may be designed to include tags having a similar nature closer together within user search field 66, so "Italian" search chip 102 is placed next to "American" search chip 88 in FIG. 4D since they both have the same operator, rather than "Italian" search chip 102 being added at the end of the search query, i.e., after "Seafood" search chip 100.

Figure 4E:
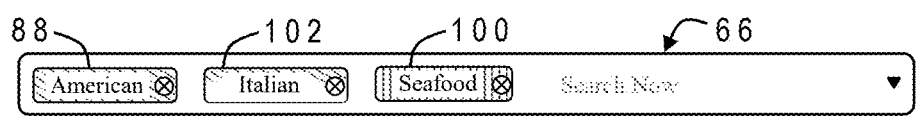

The user will then click on "Italian" search chip 102 twice (or tap, drag, etc.) successively to advance its associated operator to "PREFER", which is seen in FIG. 4E. In the illustrative implementation, the prefer/avoid operators are reminiscent visually to the include/exclude operators in that they rely on variations of green and red colors. For example, a prefer visual indicator could be a background with a green gradient, say, solid along the top and faded at the bottom, which is represented by the partial background hashing for "Italian" search chip 102 as depicted in FIG. 4E. Since a "PREFER" operator is closer in nature to an "INCLUDE" operator than an "EXCLUDE" operator ("PREFER" and "INCLUDE" have positive sentiment while "EXCLUDE" has negative), "Italian" search chip 102 still remains grouped with "American" search chip 88 within user search field 66. When the user instructs the search engine to carry out the search using the query as built in FIG. 4E, it will return results for all places that have American cuisine but not seafood, regardless of whether they have Italian cuisine, and those places also having Italian cuisine will be ranked with a higher relevance which can be reflected in the presentation of the search results as explained below in conjunction with FIG. 5.

An "AVOID" operator can be invoked in a similar manner, i.e., if the user were to click "Italian" search chip 102 a third time it would change to an avoid visual indicator presented as a chip with a red gradient (not shown). A color gradient is only one of many different visual effects that could be used to represent prefer/avoid. The effect could also use multiple colors, e.g., solid green at the top fading to yellow at the bottom for prefer and solid red at the top fading to orange at the bottom for avoid, or color saturation. The include/exclude operators and prefer/avoid operators do not have to have similar color schemes but it provides a more intuitive interface. As noted above, visual indicators in general can include more than just colors, they could also be non-colored symbols, photo images, etc.

In this manner, the user can quickly cycle through a series of predefined operators, and instantly understand what the significance of each tag is. So for this basic implementation, each time a search chip is clicked it advances the cycle through the order of "EXCLUDE", "PREFER", "AVOID" and then back to "INCLUDE" where it began by default (the default setting can be changed). There could of course be many other operators, and this particular order for cycling is merely exemplary. Operators could also be assigned other than by a single ("left") mouse click, e.g., by a combination of a key (the control or alt keys) and a mouse click, or by other mouse operations such as right clicking, double clicking, etc.

Figure 5:
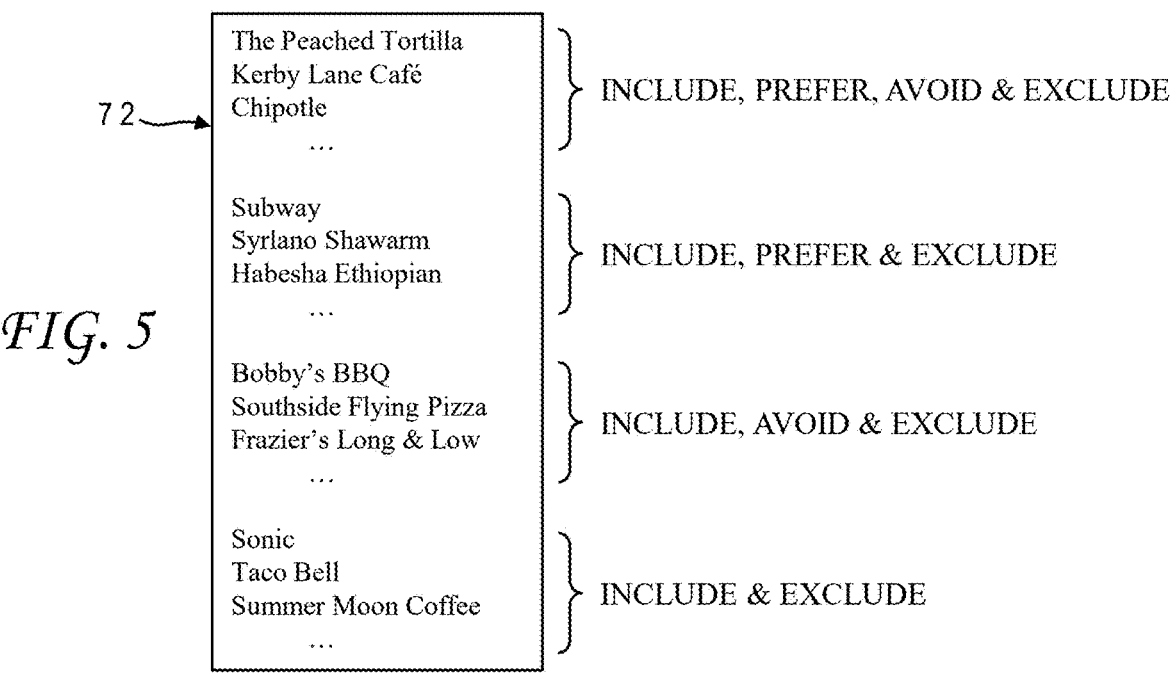
FIG. 5 is a list of search results that may be displayed with the search engine interface exemplifying ordering of results based on four operators consisting of INCLUDE, PREFER, AVOID and EXCLUDE in accordance with one implementation of the present invention.

As noted above, search engine interface 62 can present search results to the user in a certain order depending on the various search chip operators appearing in the search query. FIG. 5 shows how search results might be presented in results pane 72 or in another window of the interface for a sample query having four search chips comprising: INCLUDE American; PREFER Italian; AVOID Fast Food; and EXCLUDE Seafood. For this particular set of operators, the results will be displayed in four groups with the ones deemed most relevant at the top and the least relevant at the bottom. The most relevant results (first group) are the ones that meet all four of the search criteria, i.e., dining establishments that have both American and Italian cuisine but do not have seafood and are not fast food restaurants. The next most relevant results (second group) are those that meet three of the four criteria, in this case, dining establishments that have both American and Italian cuisine and do not have seafood but are fast food. The next most relevant results (third group) are those that meet a different three of the four criteria, in this case, dining establishments that have American cuisine but not Italian, do not have seafood, and are not fast food. Thus, according to this implementation a "PRE- FER" operator takes precedence over an "AVOID" operator but this could be an adjustable setting. The least relevant results (fourth group) are those that meet only the two hard requirements, i.e., have American cuisine but not seafood. This last group will therefore include establishments that are both considered fast food and do not have Italian cuisine. This example is fairly simple since it uses only four operators that are readily categorized by relevance, but other ordering schemes will become apparent for search equations with more complicated operators. There could also be further refinement of the rankings within each group based on a variety of factors. The term "top" as used in this regard must be considered relative and not absolute as there may be other exceptional search results above the "top", e.g., a result that is a paid advertisement.

Other methods can additionally be used to order or group results beside a vertical list. Other bases may be used to prioritize or rank search results. These may for example include new establishments, up-and-coming or trending, awards, most-loved by customers, or most recommended by reviewers. Some of these attributes may need frequent temporal updating as trends can quickly arise and fade. Trending venues might be based on overall popularity of the venue, or based on the sudden popularity of some dish (e.g., "unicorn toast") or fad (e.g., "girl dinner") that is available at the venue.

Figure 6A:
FIGS. 6A-6D are partial screenshots of the user search field of the search engine interface showing how a user can insert non-tag operations into the search query in accordance with one implementation of the present invention.
Figure 6B:
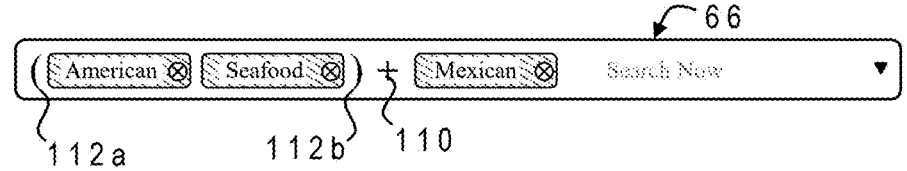
Figure 6C:
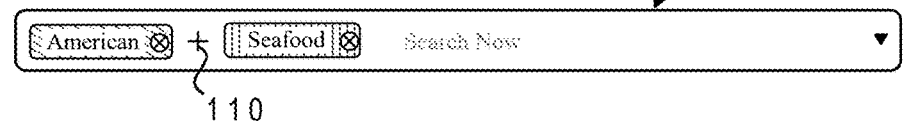
Figure 6D:
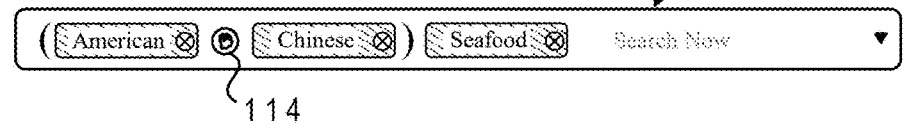

Referring now to FIGS. 6A-6D, in addition to the placement of multiple tag/operator search chips in user search field 66, the present invention also envisions the user being able to insert pure operators, that is, an operator that applies to other existing chip objects within the search field without any specific tag associated with the pure operator itself. The pure operator can be added to the search query in response to any convenient user command, like clicking a spot in user search field 66 relative to locations of the search chips to be operated on, and then hitting a particular key. For example, FIG. 6A depicts a search query having an "INCLUDE" "American" search chip and an "INCLUDE" "Seafood" search chip, and the user has inserted a plus symbol "+" which acts as an "OR" operator. The search query for FIG. 6A thus changes the meaning of the starting equation from including only those establishments having both American cuisine and seafood to including any establishment that offers either of these selections. FIG. 6B shows another search query which uses an open/closed parentheses pair 112a, 112b as a pure operator, to indicate a grouping of chips for purposes of ordered evaluation of the equation, along with the plus "OR" operator adding a Mexican cuisine chip to the query. In this case, two people want to dine together and one wants American food while the other wants seafood, but they would both settle for Mexican, so the search query for FIG. 6B accordingly equates to any establishment having either (i) both American cuisine and seafood, or (ii) Mexican dishes. Search chips within user search field 66 can still be manipulated as described above in conjunction with pure operators. FIG. 6C shows a query with a plus "OR" operator between the "American" and "Seafood" search chips, but the seafood search chip has now been activated to toggle the "EXCLUDE" operator, so the corresponding equation is any establishment that has American cuisine, or any establishment that does not have seafood. These three FIGS. 6A-6C are fairly basic representations to give the reader a feel for how pure operators can be used along with the interactive search chip objects in user search field 66, but there can of course be a multitude of other complicated equations including variations of these pure operators (e.g., nested groups using multiple pairs of parentheses), as well as other types of pure operators. For instance, an exclamation point symbol "!" could act as a pure "NOT" operator to negate any expression. Standard logic symbols may also be employed, like the intersection symbol ("∩", same as AND), NAND ("|" or "↑"), XOR ("∀" or "⊕"), and OR ("∪" or "+"). Some of these operators may be particularly useful in different search contexts, such as NAND and XOR operators for real estate searching. The user can additionally drag-and-drop a search chip to move it within user search field 66 relative to other chips or pure operators, and search engine interface 62 will responsively rearrange the logic of the search query according to the new chip/operator locations.

In addition to basic Boolean operators, the present invention in some implementations may include more advanced operators for specialized functions. One such function is referred to herein as the coin-flip operator, and is described in conjunction with FIG. 6D. This search query has three search chips, all "INCLUDE", for American, Chinese and seafood tags, with the "American" and "Chinese" chips being grouped together by parentheses but separated by a coin-flip operator 114 (a stylized icon for a coin). Coin-flip operator 114 can be inserted via any user command (such as entering the word "coin" in the user search field), or by clicking a designated interactive button of search engine interface 62 like coin-flip icon 74 (FIG. 3A). Coin-flip operator 114 is used to randomize a selection of only a single chip from a group of two or more chips. So for this example, the search engine interface will "flip a coin" before parsing the search query to decide whether to include the "American" chip or the "Chinese" chip, i.e., the search engine interface will derive one of two different search queries for execution by the search engine, either (i) any establishment that has both American food and seafood, or (ii) any establishment that has both Chinese food and seafood. The randomization can be re-initiated based on certain user inputs, like repeating the search execute command, or moving the map area in map pane 70 of search engine interface 62.

Figure 7A:
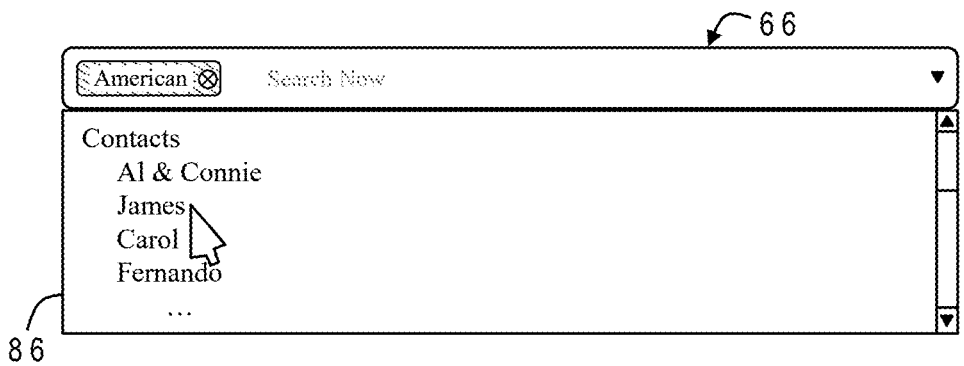
FIGS. 7A-7B are partial screenshots of the user search field and drop-down menu from the search engine interface demonstrating how a drop down menu can include tags for dining locations that have been recommended by contacts of the user in accordance with one implementation of the present invention.
Figure 7B:
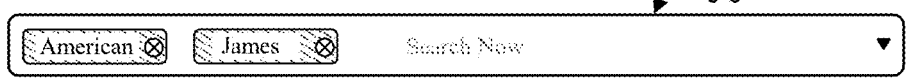

Along with providing a variety of unique types of pure operators, the present invention can be implemented with a wide assortment of tags for search chip objects that go beyond just keywords. FIGS. 7A-7B illustrate the use of one such tag for contacts of the user (acquaintances or friends), allowing the user to constrain search results to particular venues that have been recommended or visited by a contact. The contacts list may be built from scratch using ancillary functions of search engine interface 62 or by importing a list such as from an email address list, texting (Short Messaging Service) contacts list, or any other messaging service. The places recommended by a particular contact can also be curated via a collaboration scheme described further below in conjunction with FIGS. 9A-9B. A user can invoke this feature via any convenient input (such as entering the word "contacts" in the user search field), or by clicking a designated interactive button of search engine interface 62 like contacts icon 76 (FIG. 3A). As seen in FIG. 7A, this command causes a "Contacts" list of available tags to appear in drop-down menu 86, from which the user can select one or more names. The user could also just type in the name of a given contact for a match. FIG. 7B shows how the user has added the "James" tag, so the search query will return results of all American cuisine places that contact James has recommended. In some implementations of the present invention, a similar but separate list is provided for "tastemakers", that is individuals who are considered influencers, professional reviewers, or celebrities that the user admires.

Those skilled in the art will appreciate that, in addition to both the tag function and its associated operator, all of these search chips (including the contacts or tastemakers) are also interactive objects and can be manipulated within the user search field as heretofore described. For example, a user might be very distrustful of the recommendations of a particular tastemaker, so that tastemaker tag can be added to the search query and its search chip activated until it toggles to the "EXCLUDE" operator.

Figure 8A:
FIGS. 8A-8B are partial screenshots of the user search field and drop-down menu from the search engine interface demonstrating how a drop down menu can include tags for special considerations for a dining location in accordance with one implementation of the present invention.
Figure 8B:
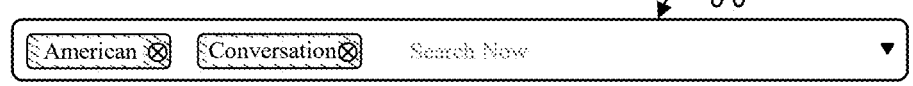

Another type of tag may be provided for special characteristics of a dining venue that do not fit in any other generalized list. Such a "Specials" list is seen in drop-down menu 86 as depicted in FIG. 8A. In this context, "specials" is not considered as particular deal offerings for products like a lowered price but rather a miscellaneous category for odd or disparate tags. A user can invoke this feature via any convenient input (such as entering the word "specials" in the user search field), or by clicking a designated interactive button of search engine interface 62 like specials icon 78 (FIG. 3A). This list can encompass so many conditions (positive or negative) it is impractical to list them all, but the following is considered exemplary and not exhaustive: child friendly; good for conversation (based on ambience like surroundings, known activity and noise levels); table types (booth, large table, bar stools, or a rare table like the "Chef's table" with a view of the kitchen); wait list; catering availability; pricing; expert ratings; sponsorship; good view; drink types (cocktails); dishes under a particular calorie level; specific dishes (e.g., filet mignon); and dining areas (e.g., outdoors). FIG. 8B shows how the user has added the "Conversation" tag, so the search query will return results of all American cuisine places that have been deemed good for conversation.

One set of tags that might be considered related to "Specials" is a "vibes" attribute for a venue/place/menu/event. In the preferred implementation, the search engine interface does not just list basic information like an old school phone book, but further attempts to explain and quantify the "WHY of WHERE" and "WHY of WHAT" of a business establishment, in essence, why someone chooses to go somewhere particular to eat, and why they pick a certain dish. "Why" means different things to different people, and often is an incorporation of many combinations of the different vibes we list. Some people are price sensitive or menu sensitive, or are driven by setting, occasion, social aspects, novelty, etc. Some of these attributes can be identified as: a "Setting" type, i.e., the physical look-and-feel of a venue; a "Social" type, i.e., the human aspect of what interaction feels like; an "Occasion" type, i.e., what kind happenings or events might be found there; a "Food and Drink" type, i.e., what the venue's overall cuisine, style, and specialties are like; an "Accessibility" type, i.e., easy or difficult for persons with various disabilities; and a "Niche" type, i.e., an internal classification based on the type of service provided and what drives patronage. All of these tag types help tailor the experience of the venue owner's profile to fit the type of customer they designed their concept for.

Figure 9A:
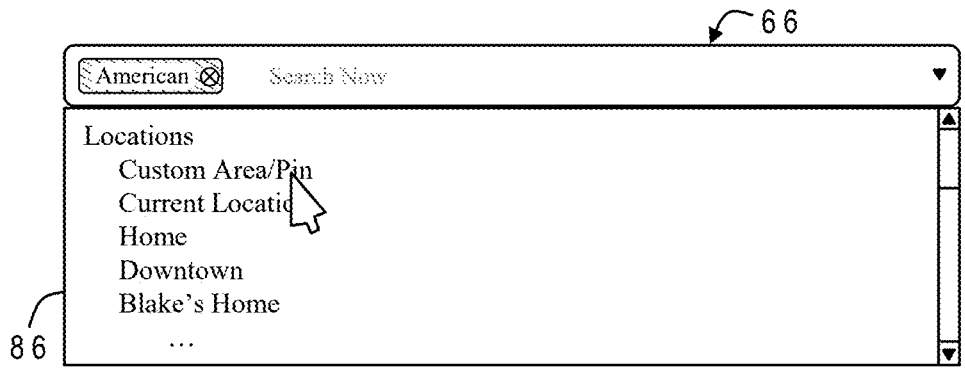
FIGS. 9A-9B are partial screenshots of the user search field and drop-down menu from the search engine interface demonstrating how a drop down menu can include tags for geographic areas or foci in accordance with one implementation of the present invention.

Another useful type of tag that can be implemented with the search chip objects of the present invention relates to geographic areas or locations. Such a "Locations" list is seen in drop-down menu 86 as depicted in FIG. 9A. A user can invoke this feature via any convenient input (such as entering the word "locations" in the user search field), or by clicking a designated interactive button of search engine interface 62 like locations icon 80 (FIG. 3A). As with many of the foregoing search chip types, a location search chip can be polymorphic, that is, different chips can represent significantly different concepts, but all still relating to location. For example, a location tag might be based on a map pin-a single point used as a reference for drawing a shape, e.g., the pin is the center of a circle. In contrast, a location tag might be based on a user-drawn area and not on any single point. The user can draw the area freehand or using drawings tools provided from search engine interface 62 and invoked via a "Custom Area/Pin" tag in the locations list. Additionally, a location tag can involve a different metric than just distance; instead of a location being defined by a radius of a certain number of miles (say 5 miles), it might reference a time frame for travel based on known traffic patterns and current conditions (say, 20 minutes) from a starting location. The locations list can be originally populated by the user manually entering information for various predefined locations via a separate dialog box (not shown), or from default areas provided by search engine interface 62 based on the map area (e.g., downtown) currently displayed in map pane 70, or by importing locations as part of the collaborative process discussed below. Search engine interface 62 can implement appropriate features to allow the user to adjust location details such as pin location, radius or travel time.

Figure 9B:
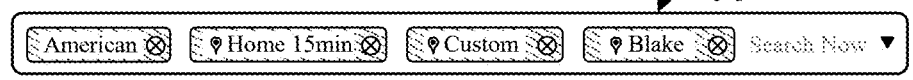

FIG. 9B shows how, further to this example, the user has added three location search chips to the starting "American" chip. The added chips include a "Custom" search chip, a "Home 15 min" search chip, and a "Blake" search chip. Each of these three chips can be identified as a location search chip by the map pin icon appearing along the left side of each. The "Custom" search chip represents an area that has been custom selected by the user as described above. The "Home 15 min" search chip defines a boundary that is considered to be 15 minutes from the user's home. It may be that a "Home" tag appearing in drop-down menu 86 has some other travel time currently assigned, or assigned by default, such as 15 minutes, but for this search the user wants to expand the travel time. This might be accomplished by the user initially adding a simple "Home" search chip (not shown) to the search query and then invoking an adjustment routine for the chip, such as by right clicking on it. Thus the tag as visually appearing on a search chip in user search field 66 can be dynamically generated. The third location search chip "Blake" is a simple 1 mile radius centered on Blake's home. Each of these chips has an "INCLUDE" operator, so the search query as constructed in FIG. 9B will return results for all establishments that: (i) serve American cuisine, (ii) are within 15 minutes of the user's home, (iii) are within 1 mile of Blake, and (iv) are within the user-defined area. A location tag can also be provided using a current location of the user for when the search service is being accessed by a mobile device, such as smartphone 54a or automobile computer system 54d (FIG. 2). When the location tag is selected from the "Locations" list, the mobile device will use conventional GPS technology to pinpoint the device and assign those coordinates to a "Current Loc" search chip (not shown) added to the query, which is then used as a map pin for computing the associated area. As apparent from the inclusion of the "American" search chip in the search query of FIG. 9B, location search chips can be combined in any arrangement with other types of search chips.

It is again important to note that these search chips do not just represent tag and operator but are additionally interactive objects. Accordingly, a user might want to avoid a certain part of town and so could draw a custom area, add that area as a location search chip in user search field 66, and then activate it until the associated operator cycles to "EXCLUDE". In this manner, the search results will not contain any destinations in the prohibited area. Also, any of the foregoing types of search chips could be used in combination, e.g., a single search query could have a cuisine search chip, a dietary search chip, a venue type search chip, a contacts search chip, a special search chip, and a location search chip, in any operative combination.

Since search queries built in accordance with the present invention may thus become somewhat intricate, search engine interface 62 can offer the user an option to save any given search query, before or after execution of the search. A query can be saved on a permanent memory device of computer system 10 from FIG. 1 like a hard drive (an I/O object 24) or USB memory stick, or saved in the cloud. The query can be saved via any keyboard or mouse command or combination thereof. For example, the user can right click the mouse when it is hovering over a blank portion of user search field 66 as seen in FIG. 3C, resulting in display of a pop-up menu which includes a "Save" command (not shown). This saves all of the search chips as present in the pseudo-Boolean equation defined by the build search query. Each search query can be saved with a separate name. The saved information may further include the map area defined by map pane 70 at the moment the query is saved, using any coordinate system. Previously executed queries (whether saved or not) can also be separately stored in a search history.

One particularly useful search query to save is a "My Diet" query that includes all of the preferences/requirements a user might want as a starting point for any search. This feature can again be activated in a variety of ways, such as right clicking the mouse when it is in user search field as described above, with an option in the pop-up menu to set the current search query to the default search. Search engine interface 62 may further allow the user to save this multi-chip query as a "Default" search chip (not shown), i.e., a singular interactive object that can be added to user search field 66. The "Default" search chip is parsed to automatically include all of the search logic embedded in the default search query. Other tailor-made search queries users might want to save include subjects like "My Favorites", "Want To Try", "Vacation Planning", "Date Night", or "Low Calorie Meals".

The present invention additionally offers great benefits when used in a collaborative fashion. For example, since search queries can be saved, they can also be shared. To this end, search engine interface 62 can optionally be provided with message/communication features that allow transmission of query-related information between different users. A user could right click on the blank portion of user search field 66 as described above to bring up the query menu for saving, and that menu can further include a "Send" command which initiates a transfer process that allows the first user to select the recipient and transmit the query. Alternatively, the user could add one of the previously described "Contacts" search chips (e.g., "James") to the search query and then right click on that chip, which would present the "Send" command among others. Individual search chips (e.g., custom) can also be shared in this manner. Instead of peer-to-peer communications, a host search system can maintain a shared collection of search queries from multiple users. The host search system may be one of the cloud servers 52 of FIG. 2. Conventional file sharing protocols can be used to cooperatively build a search query in real time between multiple users. Creators of a particular search chip may be designated as owners and can assign revocable permissions whose security is guaranteed by the host search system. The "Default" search chips described in the foregoing paragraph can also be shared, making it incredibly simple to build a collaborative search query that satisfies everyone in a group without further ado.

Figure 10:
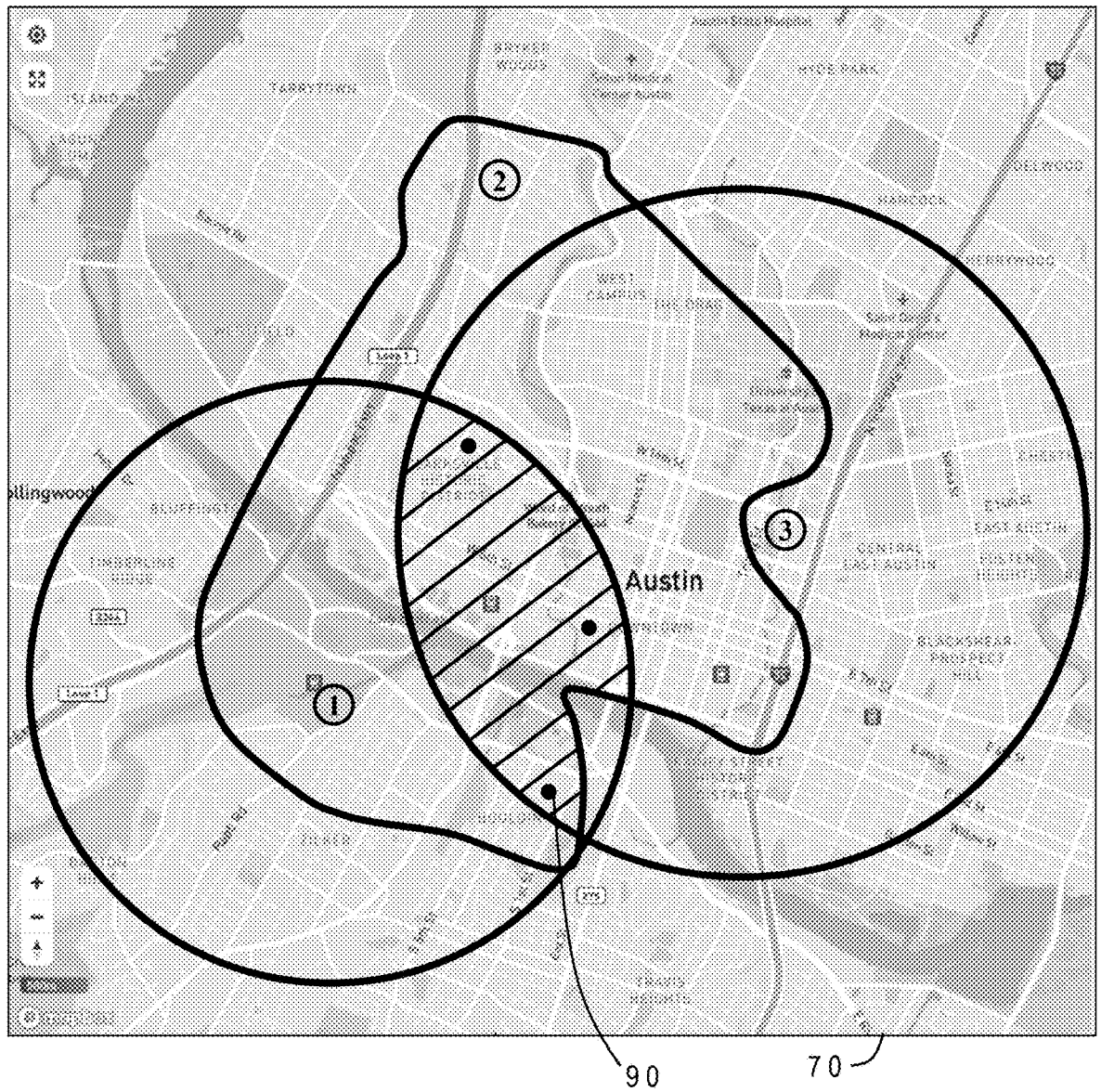
FIG. 10 is a pictorial representation of a partial screenshot for a map of a metropolitan area illustrating how a search engine operating in accordance with one implementation of the present invention can compute an overlap area for multiple selected geographic boundaries using the geographic tags of FIGS. 9A-9B.

Returning to FIG. 9B, it can now be understood that the search query depicted therein may possibly have been constructed in a collaborative manner, perhaps with a first user requesting American food within 15 minutes of the first user's home, a second user requesting anyplace within a custom-defined area, and a third user requesting anyplace within 1 mile of Blake's home. In order to facilitate presentation of the results for such a search, search engine interface 62 constructs a graphic overlay for map pane 70 to highlight an intersection region that satisfies all three of the noted areas as illustrated in FIG. 10. The first area (15 minutes from home) has a circle label with "1" inside, the second area (custom) has a circle label with "2" inside, and the third area (1 mile of Blake) has a circle label with "3" inside. The intersection region is shown with diagonal hash lines, and represents a Venn diagram for the three areas. The map locations of any search results can again be indicated by small colored dots 90 on the map within map pane 70.

Figure 11:
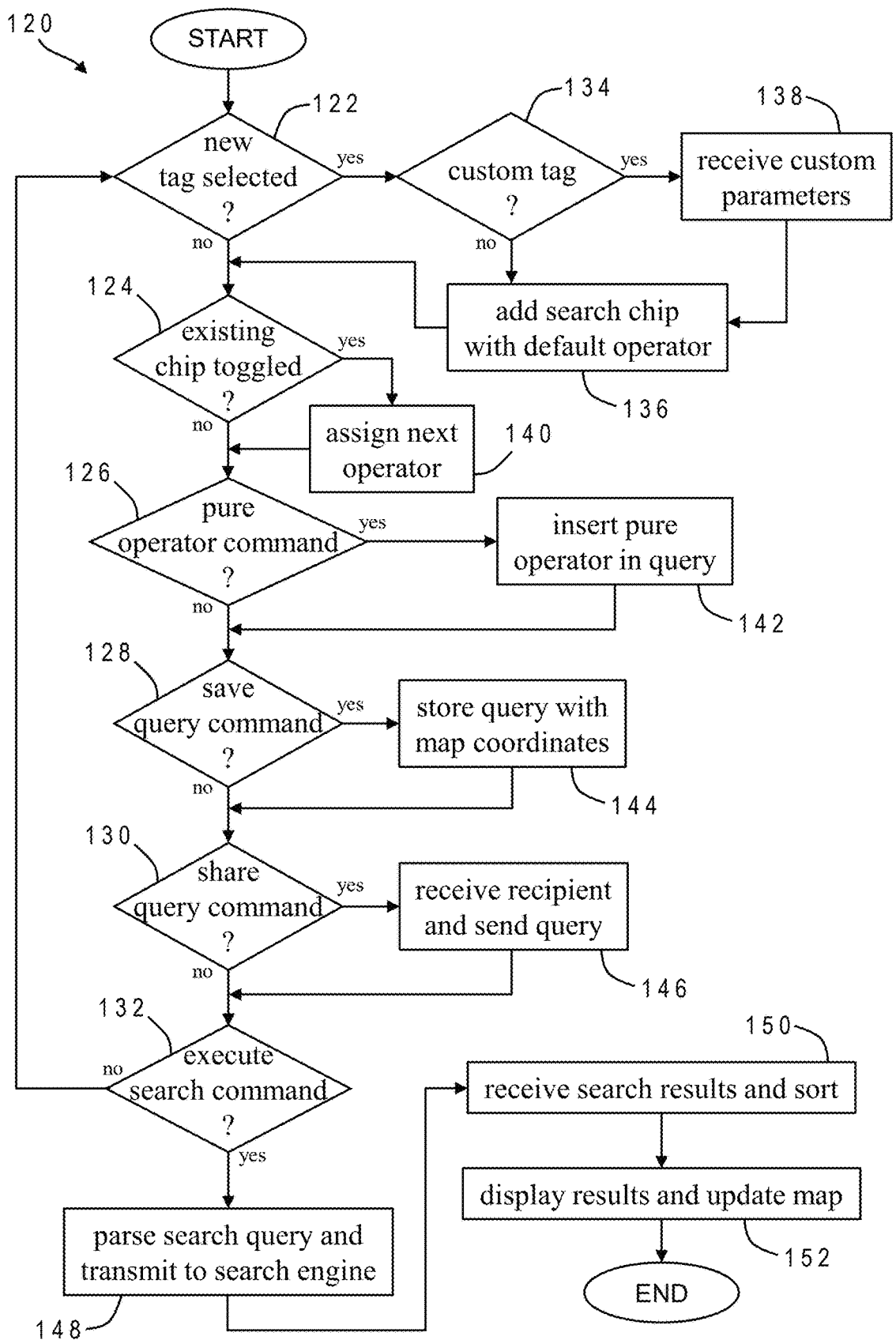
FIG. 11 is a chart illustrating the logical flow for an exemplary search query build process in accordance with one implementation of the present invention.

The present invention may be further understood with reference to the chart of FIG. 11 illustrating the logical flow for a search query build process 120 in accordance with one implementation of the present invention. There are many variations and options to the various embodiments previously described that cannot adequately be shown in a single flow chart so the reader will understand that FIG. 11 represents only an exemplary process. Process 120 begins in a wait mode for the user to provide some input which may include selecting a new tag 122, toggling an existing search chip 124, adding a pure operator 126, saving a query 128, sharing a query 130, and executing the completed search query 132. Those skilled in the art will therefore appreciate that the user inputs 122, 124, 126, 128, 130, 132 may be carried out in any order, and at any time other tags or pure operators can be added or previously assigned operators can be further changed.

When search engine interface 62 detects that the user has selected a new tag 122, it will first check to see if the selection requires customization 134. If not, a search chip is added to the query 136 based on the selected tag and assigned the default ("INCLUDE") operator. If it is a custom tag, then a customization interface will open 138 to allow the user to enter the custom parameters. When search engine interface 62 detects that the user has toggled an existing search chip in the query 124 (e.g., by left clicking on it), the operator assigned to that chip advances to the next available operator in the default cycle 140. When search engine interface 62 detects that the user has hit a key for a pure operator 126 (such as the plus key "+"), it inserts the corresponding pure operator 142 (e.g., "OR") at the location of the cursor within the user search field and updates the search query logic accordingly. When search engine interface 62 detects that the user has issued a command to save the search query 128, it stores the current search query 144 (all tags and operators) along with the map information. When search engine interface 62 detects that the user has issued a command to share a search query 130, it opens a messaging interface to receive the recipient information from the user and then sends the current query to the recipient 146.

Once search engine interface 62 detects that the user has issued the command for executing the search on the currently built query, it parses the query and transmits the pseudo-Boolean equation represented thereby to the search engine 148, and thereafter receives the search results back and can sort them 150 according to predetermined rules.

These steps 148 and 150 could instead be performed by the local computing device carrying out the search engine interface functions in those embodiments where the subject databases and searching functions are available on the local computing device.

The present invention accordingly provides a superior user interface for computerized searching which more intuitively informs the user of the logical meaning of a search query that can otherwise seem confusing. Use of search chips which have both a tag and a visual feature representing an operator make it easier to understand the nature of the query terms. Moreover, making these search chips interactive objects significantly simplifies and expands their capabilities, such as being able to quickly assign a different search operator to a particular search chip. The ability to implement extended tag functionalities like contacts, special characteristics, or geographic areas creates an even more powerful foundation for searching. The search engine interface of the present invention further allows for customization of searching in ways heretofore unknown, and additionally offers opportunities for collaboration that greatly streamlines the searching process when multiple users are involved. The search engine interface can provide for improved presentation of search results as well.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described with reference to the specific application of finding a place to eat, it is not so limited and can be applied to practically any subject matter, including those having no geographic context. In particular, in addition to the real estate application mentioned above, the invention could be applied to any e-commerce searches, legal researching, or finding any type of product. The types or categories of tags can also vary correspondingly, such as being able to search for specific brands of products at retail stores. The exact details of the search engine interface can also vary widely according to designer preferences, such as placement of interface elements like the user search field, map pane, results pane, drop-down and pop-up menus, etc. It is therefore contemplated that such modifications can be made without departing from the spirit or scope of the present invention as defined in the appended claims.

What is claimed is:

1. A computer-implemented method of building a search query using a search engine interface comprising:
   presenting to a user one or more lists of tags using the search engine interface;
   receiving a first selection from the user of a first one of the tags;
   adding a first search chip to the search query wherein the first search chip is displayed in a user search field of the search engine interface with the first tag and a first visual indicator representing a first operator associated with the first tag;
   receiving a second selection from the user of a second one of the tags different from the first tag; and
   adding a second search chip to the search query in addition to the first search chip wherein the second search chip is displayed in the user search field with the second tag and a second visual indicator representing a second operator associated with the second tag, the second visual indicator being different from the first visual indicator and the second operator being different from the first operator;
   wherein
   the first operator is a default operator initially assigned automatically to both the first search chip and the second search chip;
   the second search chip is initially displayed with the first visual indicator in the user search field;
   the second operator is thereafter assigned to the second search chip in response to receiving a user command to change an operation for the second search chip whereupon the second search chip is then displayed with the second visual indicator; and
   the first and second search chips are interactive objects, and the user command to change the operation for the second search chip is received by detecting a user activation of the second search chip as initially displayed in the user search field.

2. The computer-implemented method of claim 1 wherein:
   the first visual indicator is a first color; and
   the second visual indicator is a second color different from the first color.

3. The computer-implemented method of claim 2 wherein:
   the first operator is an INCLUDE operator;
   the second operator is an EXCLUDE operator;
   the first color is a shade of green; and
   the second color is a shade of red.

4. The computer-implemented method of claim 1 further comprising adding a pure operator to the search query without any associated tag in response to a user command to insert the pure operator at a specific location in the user search field relative to locations of the first and second search chips.

5. The computer-implemented method of claim 4 wherein the pure operator is an OR operator.

6. The computer-implemented method of claim 4 wherein the pure operator is an coin-flip operator that results in random use of only one of the first or second search chips in carrying out a search.

7. A computer system comprising:
   one or more processors which process program instructions;
   a memory device connected to said one or more processors; and
   program instructions residing in said memory device for building a search query using a search engine interface by presenting to a user one or more lists of tags using the search engine interface, receiving a first selection from the user of a first one of the tags, adding a first search chip to the search query wherein the first search chip is displayed in a user search field of the search engine interface with the first tag and a first visual indicator representing a first operator associated with the first tag, receiving a second selection from the user of a second one of the tags different from the first tag, and adding a second search chip to the search query in addition to the first search chip wherein the second search chip is displayed in the user search field with the second tag and a second visual indicator representing a second operator associated with the second tag, the second visual indicator being different from the first visual indicator and the second operator being different from the first operator;
   wherein the first operator is a default operator initially assigned automatically to both the first search chip and the second search chip;

the second search chip is initially displayed with the first visual indicator in the user search field:

said program instructions thereafter assign the second operator to the second search chip in response to receiving a user command to change an operation for the second search chip whereupon the second search chip is then displayed with the second visual indicator; and the first and second search chips are interactive objects, and the user command to change the operation for the second search chip is received by detecting a user activation of the second search chip as initially displayed in the user search field.

8. The computer system of claim 7 wherein:
the first visual indicator is a first color; and
the second visual indicator is a second color different from the first color.

9. The computer system of claim 8 wherein:
the first operator is an INCLUDE operator;
the second operator is an EXCLUDE operator;
the first color is a shade of green; and
the second color is a shade of red.

10. The computer system of claim 7 wherein said program instructions further add a pure operator to the search query without any associated tag in response to a user command to insert the pure operator at a specific location in the user search field relative to locations of the first and second search chips.

11. The computer system of claim 10 wherein the pure operator is an OR operator.

12. The computer system of claim 10 wherein the pure operator is an coin-flip operator that results in random use of only one of the first or second search chips in carrying out a search.

13. A computer program product for a search engine interface comprising:
one or more computer readable storage media; and
program instructions collectively residing in said one or more computer readable storage media for building a search query using a search engine interface by presenting to a user one or more lists of tags using the search engine interface, receiving a first selection from the user of a first one of the tags, adding a first search chip to the search query wherein the first search chip is displayed in a user search field of the search engine interface with the first tag and a first visual indicator representing a first operator associated with the first tag, receiving a second selection from the user of a second one of the tags different from the first tag, and adding a second search chip to the search query in addition to the first search chip wherein the second search chip is displayed in the user search field with the second tag and a second visual indicator representing a second operator associated with the second tag, the second visual indicator being different from the first visual indicator and the second operator being different from the first operator, wherein
the first operator is a default operator initially assigned automatically to both the first search chip and the second search chip,
the second search chip is initially displayed with the first visual indicator in the user search field,
said program instructions thereafter assign the second operator to the second search chip in response to receiving a user command to change an operation for the second search chip whereupon the second search chip is then displayed with the second visual indicator, and the first and second search chips are interactive objects, and the user command to change the operation for the second search chip is received by detecting a user activation of the second search chip as initially displayed in the user search field.

14. The computer program product of claim 13 wherein:
the first visual indicator is a first color; and
the second visual indicator is a second color different from the first color.

15. The computer program product of claim 14 wherein:
the first operator is an INCLUDE operator;
the second operator is a EXCLUDE operator;
the first color is a shade of green; and
the second color is a shade of red.

16. The computer program product of claim 13 wherein said program instructions further add a pure operator to the search query without any associated tag in response to a user command to insert the pure operator at a specific location in the user search field relative to locations of the first and second search chips.

17. The computer program product of claim 16 wherein the pure operator is an OR operator.

18. The computer program product of claim 16 wherein the pure operator is an coin-flip operator that results in random use of only one of the first or second search chips in carrying out a search.

19. A computer-implemented method of building a search query using a search engine interface comprising:
presenting to a user one or more lists of tags using the search engine interface;
receiving a first selection from the user of a first one of the tags;
adding a first interactive search chip to the search query wherein the first interactive search chip is displayed in a user search field of the search engine interface with the first tag and a first color representing an INCLUDE operator that is assigned to the first interactive search chip by default;
receiving a second selection from the user of a second one of the tags different from the first tag;
adding a second interactive search chip to the search query in addition to the first interactive search chip wherein the second interactive search chip is displayed in the user search field with the second tag and the first color representing the INCLUDE operator that is assigned by default;
receiving a first user command to change an operation for the second interactive search chip by detecting a user activation of the second interactive search chip as displayed in the user search field;
responsive to the first user command, assigning an EXCLUDE operator to the second interactive search chip and displaying the second interactive search chip with a second color different from the first color;
receiving a second user command to insert a pure operator at a specific location in the user search field relative to locations of the first and second interactive search chips; and
responsive to the second user command, adding the pure operator to the search query without any associated tag in logical relation to the first and second interactive search chips.

* * * * *